(12) United States Patent
Cossey et al.

(10) Patent No.: US 8,422,744 B1
(45) Date of Patent: Apr. 16, 2013

(54) COMPUTER BASED METHOD AND SYSTEM FOR DETERMINING A PARAMETER FOR A MATERIAL

(75) Inventors: Stephen P. J. Cossey, Durango, CO (US); William Edward Full, Wichita, KS (US)

(73) Assignee: Cossey and Associates Inc., Durango, CO (US)

( * ) Notice: Subject to any disclaimer, the term of this patent is extended or adjusted under 35 U.S.C. 154(b) by 713 days.

(21) Appl. No.: 12/622,945

(22) Filed: Nov. 20, 2009

(51) Int. Cl.
*G06K 9/00* (2006.01)

(52) U.S. Cl.
USPC .......................................................... 382/109

(58) Field of Classification Search .................. None
See application file for complete search history.

(56) References Cited

U.S. PATENT DOCUMENTS 5,168,161 A * 12/1992 Markandey ................... 250/330
7,218,775 B2 * 5/2007 Kokko et al. .................. 382/156

* cited by examiner

*Primary Examiner* — Tom Y Lu
(74) *Attorney, Agent, or Firm* — Simpson & Simpson, PLLC (57) ABSTRACT

A computer based method for determining a characteristic of a material, including accepting as input to a specially programmed portable computer, and using a processor for the computer, image data, for a surface of a material. The image data is accepted from a device including a light source and a magnifying element. Using the processor, the method: creates a binary image from the image data such that each pixel in the plurality of pixels has one of two possible values; segments the binary image such that an object occupying an area of the surface is located in the binary image and boundaries surrounding the object are located in the binary image; and generates, using the segmented binary image: one or more parameters regarding features of the material, or at least one statistical parameter regarding at least one feature in the image data.

17 Claims, 9 Drawing Sheets

COMPUTER BASED METHOD AND SYSTEM FOR DETERMINING A PARAMETER FOR A MATERIAL

FIELD OF THE INVENTION

The present invention relates generally to a computer-based method and system for determining parameters or statistics regarding a material, especially a portable computer-based method and system.

BACKGROUND OF THE INVENTION

The prior art teaches the use of destructive sampling techniques or the use of large, substantially fixed equipment in a laboratory to analyze material.

BRIEF SUMMARY OF THE INVENTION

The present invention broadly comprises a computer based method for determining a characteristic of a material, including: accepting as input to a specially programmed portable computer, and using a processor for the specially programmed portable computer, image data, for a surface of a material, wherein the image data is accepted from a device including a light source and a magnifying element and wherein the image data includes a plurality of pixels; creating, using the processor, a binary image from the image data such that each pixel in the plurality of pixels has one of two possible values; segmenting, using the processor, the binary image such that an object occupying an area of the surface is located in the binary image and boundaries surrounding the object are located in the binary image; and generating, using the processor and the segmented binary image: one or more parameters regarding features of the material selected from the group consisting of size, shape, packing, orientation in space, and porosity; or at least one statistical parameter regarding at least one feature in the image data.

The present invention also broadly comprises a computer based method for determining a parameter of a material, including: accepting as input to a specially programmed computer, and using a processor for the specially programmed portable computer, image data, for a material, from a device including a light source and a magnifying element, wherein the image data includes a plurality of pixels; creating, using the processor, a binary image from the image data such that each pixel in the plurality of pixels has one of two possible values; decomposing, using the processor, the binary image such that the plurality of pixels are grouped according to a plurality of features in the material; and generating, using the processor and the decomposed binary image: one or more parameters regarding features of the material selected from the group consisting of size, shape, packing, orientation in space, and porosity; or statistical parameters regarding features of the material.

The present invention further broadly comprises a computer based system for determining a characteristic of a material, including: a processor in a specially programmed portable computer for: accepting as input from a device including a light source and a magnifying element, image data for a surface of a material, wherein the image data includes a plurality of pixels; creating a binary image from the image data such that each pixel in the plurality of pixels has one of two possible values; segmenting the binary image such that an object occupying an area of the surface is located in the binary image and boundaries surrounding the object are located in the binary image; and generating, using the segmented binary image: one or more parameters regarding features of the material selected from the group consisting of size, shape, packing, orientation in space, and porosity; or at least one statistical parameter regarding at least one feature in the image data. The system also includes a memory unit for the specially programmed computer for storing at least one of the binary image, the segmented binary image, the one or more parameters, or the at least one statistical parameter.

The present invention broadly comprises a computer based system for determining a parameter of a material, including: a processor in a specially programmed computer for: accepting as input from a device including a light source and a magnifying element, image data for a material, wherein the image data includes a plurality of pixels; creating a binary image from the image data such that each pixel in the plurality of pixels has one of two possible values; decomposing the binary image such that the plurality of pixels are grouped according to a plurality of features in the material; and generating, using the decomposed binary image: one or more characteristics regarding features of the material selected from the group consisting of size, shape, packing, orientation in space, and porosity; or statistical parameters regarding features of the material. The system also includes a memory unit for the specially programmed computer for storing at least one of the binary image, the decomposed binary image, the one or more parameters, or the at least one statistical parameter.

A general object of the present invention is to provide a computer-based system and method for determining a characteristic of a material, in particular, a portable computer-based system and method.

This and other objects, features and advantages of the present invention will become readily apparent to those having ordinary skill in the art from a reading and study of the following detailed description of the invention, in view of the drawing and appended claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention. Example methods, devices, and materials are now described.

The following definitions are applicable to the discussion which follows:

Binary image: A binary image is a digital image that has only two possible values for each pixel. Typically the two colors used for a binary image are black and white though any two colors can be used.

Decomposition: Decomposition in imaging science refers to the process by which a complex image or similar system is broken down into its more fundamental parts that are easier to conceive, understand, program, and maintain. In our case, we decompose an image into its basic color components. If we broke an image into another set of components, say individual features (holes, grains, rocks, etc.), this would be another type of decomposition that is also call image segmentation.

Discriminant Function Analysis (DFA): Discriminant function analysis involves the predicting of a categorical dependent variable by one or more continuous or binary independent variables. It is useful in determining whether a set of variables is effective in predicting category membership. For example, the system and method described below can be direct to two groups of objects, for example, grains and grain edges or holes. An example general procedure is to create a single linear equation that best separates each group (defined by multiple variables) and use the result of this function—called a discriminant score (a single real number)—to determine with which general group an individual pixel should be classified. For example, if the discriminant score is a positive value, it belongs to the first group and if it is negative, it belongs in the second group.

Feature: In image processing the concept of feature is used to denote a piece of information which is relevant for solving the computational task related to a certain application. More specifically, features can refer to:

the result of a general neighborhood operation (feature extractor or feature detector) applied to the image; or
specific structures in the image itself, ranging from simple structures such as points or edges to more complex structures such as objects.

Other examples of features are related to motion in image sequences, to shapes defined in terms of curves or boundaries between different image regions, or to properties of such a region.

Feature Selection: Feature selection, also known as variable selection, feature reduction, attribute selection or variable subset selection, is the technique, commonly used in machine learning and image analysis, of selecting a subset of relevant features for building robust learning models and selecting image information. By removing most irrelevant and redundant features from the data, feature selection helps improve the performance of any system by:

Alleviating the effect of the curse of dimensionality.
Enhancing generalization capability.
Speeding up the analysis process.
Improving model interpretability.

Feature selection also helps people to acquire better understanding about their data by telling them which are the important features and how they are related with each other.

Filter Function: A filter in the context of image analysis, is a mathematical function or process that removes some unwanted component or feature or enhances the desired information. A filter function is the mathematical function or process that achieves the desired goal of removing unwanted component in an image (like removing random noise) or enhances some desired feature (e.g. edges).

Filtering: The act of applying a given filter function to the image.

Fourier Filter: A filter using the mathematics of Joseph Fourier (circa 1817) to decompose and filter an image to either remove undesired 'noise', enhances information or extract desired results. The Fourier mathematics have found widespread application in the geologic industry. The application of this branch of mathematics was possible with the advent of high speed computers and the development of the FFT, or Fast Fourier Transform, which enabled near real-time calculation of the basic Fourier mathematics information.

HIS: Hue, Intensity, and Saturation

Hue: Hue refers to a pure color—one without tint or shade (i.e. added white or black pigment, respectively).

Intensity: Intensity (sometimes called brightness, value or tone) is a property of a color, or a dimension of a color space, that is defined in a way to reflect the subjective brightness perception of a color for humans along a lightness-darkness axis.

Pixel: In digital imaging, a pixel (or picture element) is the smallest item of information in an image. Pixels are normally arranged in a 2-dimensional grid, and are often represented using dots or squares. Each pixel is a sample of an original image, where more samples typically provide more-accurate representations of the original.

Polynomial surface: A polynomial surface, in the present application, is a mathematical surface that is used to approximate the 'background' intensity (intensity defined by any color plane) and is used to subtract this surface from the original color plane to 'flatten' out generalized features in that surface. The form of the equations of this surface is those defining standard polynomials (for example, in 3 dimensions in the present application). A polynomial surface of first order is simply a flat plane in three dimensions. A trend surface of order 2 is a polynomial surface with one 'bump; or hill in it (can have a tilt in three dimensions). A trend surface of order 3 is a polynomial surface with potentially two 'bumps' or hills on the surface. Higher order trend surfaces allow for more 'bumps' or hills on the surface.

RGB: The RGB color model is an additive color model in which red, green, and blue light are added together in various ways to reproduce a broad array of colors. The name of the model comes from the initials of the three additive primary colors, red, green, and blue. The main purpose of the RGB color model is for the sensing, representation, and display of images in electronic systems, such as televisions and computers, though it has also been used in conventional photography.

Saturation: Saturation is defined as the difference of a color against its own brightness. As a common example, an example of saturation is when clothes get faded with repeated washing where the color is essentially the same, but each wash removes a bit of the color thereby changing the saturation of that color in a particular item of clothing.

Segmentation: Relative to image analysis, segmentation refers to the process of partitioning a digital image into multiple segments (sets of pixels). The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain visual characteristics.

UV Light: Ultraviolet (UV) light is electromagnetic radiation with a wavelength shorter than that of visible light, but longer than x-rays, in the range 10-400 nanometers. It is so named because the spectrum consists of electromagnetic waves with frequencies higher than those that humans identify as the color violet. UV light is found in sunlight and is emitted by electric arcs and specialized lights such as black lights.

White Light: White light is considered any electromagnetic radiation of such wavelengths as can be seen by the human eye.

Figure 1:
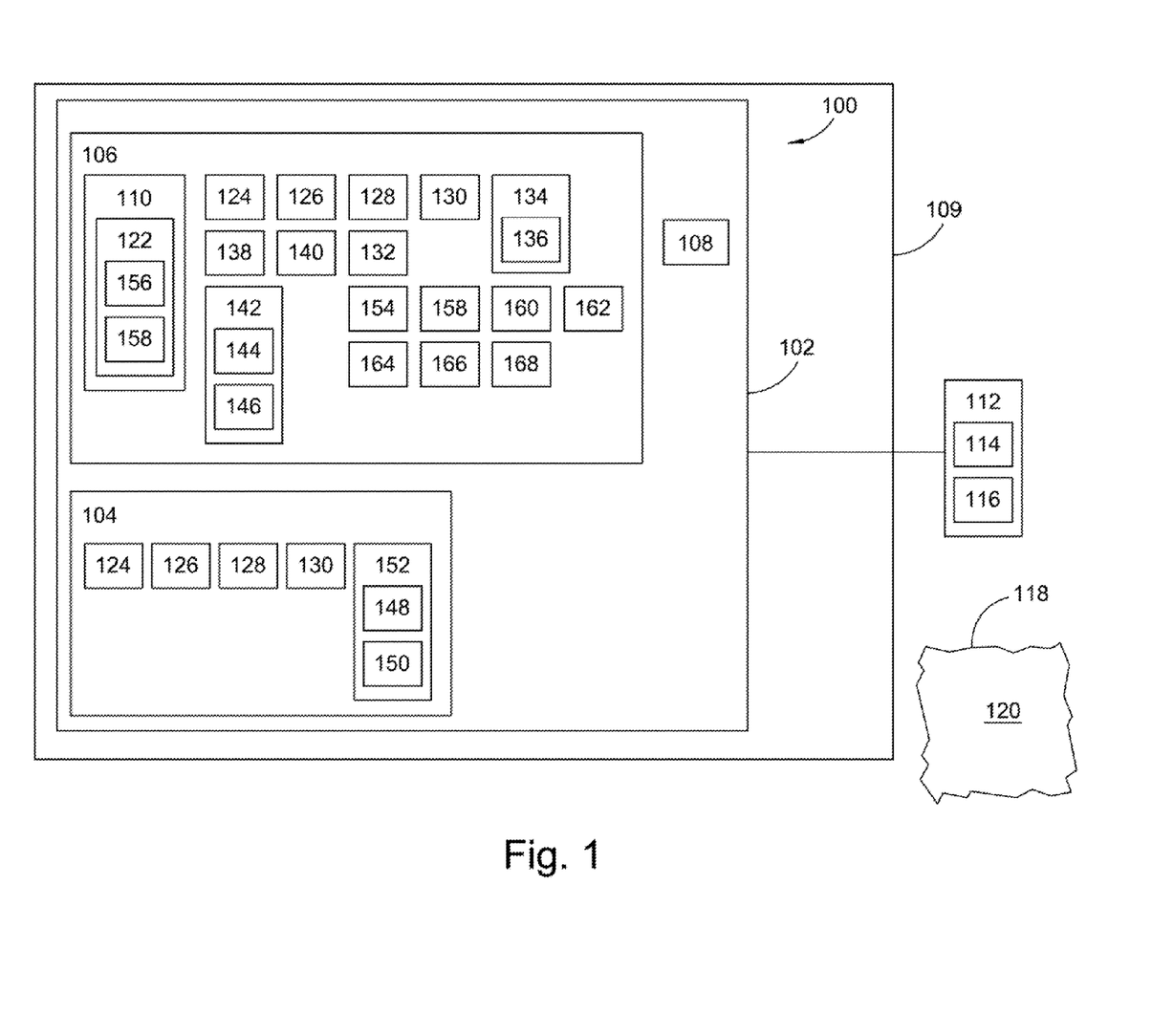
FIG. 1 is a schematic block diagram of a computer-based system for determining a characteristic of a material; and, FIGS. 2-13 are photographs of screens illustrating operation of a computer-based system for determining a characteristic of a material.

FIG. 1 is a schematic block diagram of a computer-based system 100 for determining a characteristic, or a parameter, of a material. The system includes specially-programmed general purpose computer, for example, computer 102, with memory element 104, processor 106, and interface element 108. In an example, embodiment, computer 102 is a portable computer by which we mean that the computer can be easily carried and used by a single person. For example, a geologist during surveys in the field can carry and use computer 102 for extended periods of time and in a variety of field conditions. Non-limiting examples of devices suitable for computer 102 include "Toughbook H1" and "Toughbook U1" by Panasonic. By interface element, we mean any combination of hardware, firmware, or software in a computer used to enable communication or data transfer between the computer and a device, system, or network external to the computer. The interface element can connect with the device, system, or network external to the computer using any means known in the art, including, but not limited to a hardwire connection, an optical connection, an Internet connection, or a radio frequency connection. Processor 106 and interface element 108 can be any processor or interface element, respectively, or combination thereof, known in the art. In one embodiment, some or all of the transmissions to and from computer 100 are via the interface element.

Computer 102 can be any computer known in the art. Examples include, but are not limited to: desktops, laptops, workstations, mini-laptops, e-computers, PDA's, properly equipped cell phones, and Blackberry-type phones.

Processor 106 is for accepting input 110 from device 112 including light source 114 and magnifying element 116. The light source can be any type or light source known in the art or any combination of light sources known in the art. In an example embodiment, the light source is a white light source. In an example embodiment the light source is a dual white light and ultra-violet light source. Input 110 is image data for surface 118 of material 120. The image data includes plurality 122 of pixels. In an example embodiment, the processor creates binary image 124 from the image data such that each pixel in the plurality of pixels has one of two possible values. The processor is for segmenting the binary image to create segmented image 126 such that an object occupying an area of the surface is located in the binary image and boundaries surrounding the object are located in the binary image. The processor generates, using the segmented binary image one or both of the following: one or more parameters, or characteristics. 128 regarding features of the material, or at least one statistical parameter 130 regarding at least one feature in the image data. In an example embodiment, the processor decomposes the binary image such that the plurality of pixels are grouped according to a plurality of features in the material and generates, using the decomposed binary image, one or both of the following: one or more parameters 128 regarding features of the material, or at least one statistical parameter 130 regarding at least one feature in the image data.

The feature can be any feature known in the art and applicable to material 120, for example, physical/structural features including a hole in the material, a grain in the material, size, shape, packing, orientation in space, porosity, relative travel distance parameter (elongation versus roundness ration parameter). Shape can also be in terms of, for example, classical parameters (inscribed circles, superscribed circles), Fourier in closed form, Zahn-Roskies Fourier shapes, and fractal shape parameters. The statistical parameter can be any such parameter known in the art, for example, average, standard deviation, standard error, skewness, kurtosis, sorting, chi-square, entropy, F-statistic, student's T-statistic, various regression statistics (r, R-square and Mallows' Cp).

Memory unit 104 is for storing at least one of binary image 124, segmented binary image 126, parameter 128, or statistical parameter 130.

In an example embodiment, the processor creates color image planes 132 from the image data. In an example embodiment, the color image planes are hue, saturation, and intensity (HIS) planes or a red, green, blue (RGB) color model. In an example embodiment, the processor is for creating composite image 134 from the image data. In an example embodiment, planes 132 are used to create the composite image. In an example embodiment, the processor equalizes data 136 for the composite image by flattening polynomial surfaces due to non-uniform distribution of light from the light source on the surface of the material.

In an example embodiment, the processor is for filtering all or part of the composite image to generate one or both of filtered images 138 and 140. In an example embodiment, to generate image 138, the processor uses one, some, or all of an image equalization filter, a noise reduction filter, an enhancement filter, a regional filter, a variance filter, a process filter, and erosion or dilation operations on the image. In an example embodiment, the processor performs fast Fourier filtering of the composite image to generate image 140. In an example embodiment, the processor is for creating the binary image using one or both of filtered images 138 and 140.

In an example embodiment, the processor creates the binary image by performing discriminant function analysis (DFA) on the image data by defining mathematical function 142 with dependent variable 144 and at least one independent variable 146, and predicting, for each pixel in the plurality of pixels, dependent variable 144 as related to said each pixel by independent variable 146. In an example embodiment, performing DFA using the processor includes selecting features 148 and 150 from list 152 of features for the material and generating linear equation 154 that separates pixels 156, associated with feature 148, from pixels 158, associated with feature 150. In an example embodiment, list 152 includes some or all of parameters 128 and statistics 130. In an example embodiment, the processor assigns, using the linear equation, respective discriminant scores 158 for each pixel in plurality 122, and assigns each pixel to one of discriminant category 160 or 162 related to features 148 and 150, respectively, according to respective discriminant scores 158 and discriminant threshold 164. The threshold has a value defining a boundary between the discriminant categories. In an example embodiment, the processor chooses the threshold value. In an example embodiment, the processor accepts input 166 including the threshold value.

In an example embodiment, the processor is for accepting input 168 including a different value for the discriminant threshold. The different value for the threshold defines a boundary, different than the boundary described above, between the discriminant categories. The processor re-assigns pixels 122 to one of the discriminant categories according to the respective discriminant scores and the discriminant threshold value in input 166.

FIGS. 2-13 are photographs of screens illustrating operation of a portable, computer-based system for determining a characteristic of a material. The following example description of FIGS. 2-13 is based on system 100; however, it should be understood that screens illustrating operation of a portable, computer-based system for determining a characteristic of a material are not limited a depiction based on system 100. Prior to computer 102 generating FIG. 2, an end user has used device 112 to upload image data regarding surface 118 to computer 100. The end user also has logged into computer 100 and selected a set of data, for example, data 122. In an example embodiment, the end user has selected (in screen or screens not pictured) default settings, such as file locations, a minimum number of pixels edges per feature, and whether to include features that touch the edge of an image.

Figure 2:
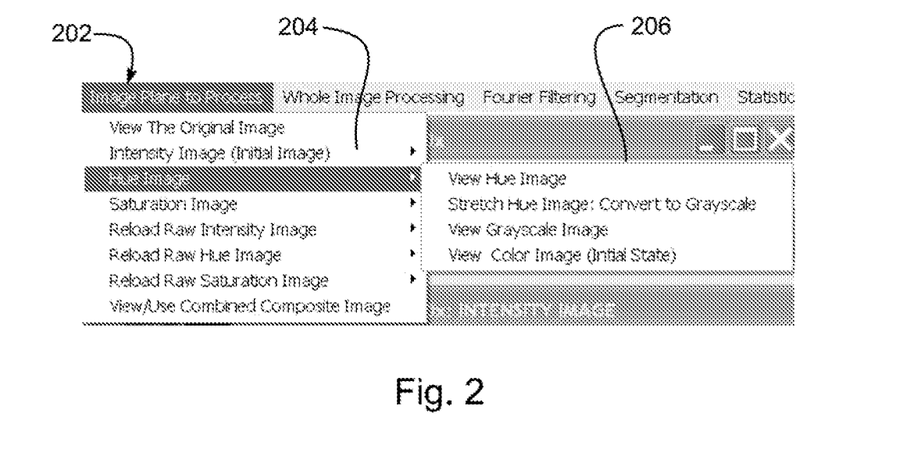

To generate FIG. 2, the end user has selected "Image Plane to Process" from toolbar 202. Menu 204 includes options related to intensity, hue, and saturation of the image or image data. Using the options in menu 204, an end user can choose an image to process, reload images, stretch images, create false color images, create individual color planes, and create a composite image. In FIG. 2, the end user has selected "Hue Image" from menu 204, causing menu 206 to display. A composite image is formed from a combination of the RGB color planes using well established mathematical formulas. The result is the creation of three statistically independent variables (HIS) each defined by a matrix the size of the original image. To view the composite image, the user selects "View/Use Combined Composite Image" from menu 204.

Figure 3:
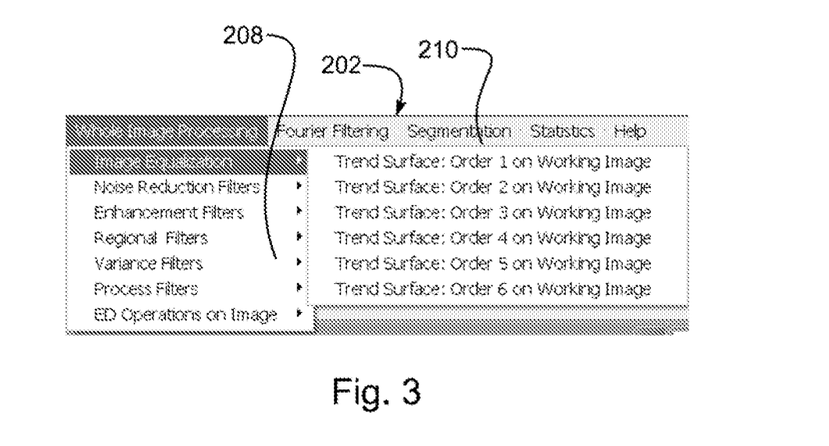

To generate FIG. 3, the end user has selected "Whole Image Processing" from toolbar 202. Menu 208 includes options for filtering operations on data 122, for example, composite image 134. For example, an image equalization filter, a noise reduction filter, an enhancement filter, a regional filter, a variance filter, a process filter, and erosion or dilation operations on the image. It should be understood that filtering options are not limited to those shown in FIG. 3. The filtering operations can be applied to all or part of an image. Note that binary image 124, described below, also can be operated upon with the filtering options.

To generate menu 210, the user has selected "Image Equalization" from menu 208. The operations shown in menu 208 can be used to process data for creation of binary image 124, can be used to refine image data for use with a measuring tool (described below), and can be used to generate macro or .proc files for automation operations. In FIG. 3, the processor can be directed to perform regional image equalization on polynomial surfaces of the composite image. In an example embodiment, the polynomial surfaces are due to non-uniform distribution of light on the surface of the material. Alternately stated, the processor removes the trend surface for the image data, or flattens the image data. The equalization is initiated by selecting In an example embodiment, the surface is flatten by selecting a trend surface polynomial of order 1 one greater (usually three or more—the choice depending on the light configuration and optical characteristics of the imaging lenses) and subtracting this surface from one or more of the images. The user uses menu 210 to select the polynomial order to be used for the image equalization. For example, "Trend Surface: Order 1 on Working Image" is for a first order. Fourier filtering, for example, a fast Fourier transform, can be performed on the selected image by selecting "Fourier Filtering" from the toolbar.

The advantage of using a polynomial surface is that the geometries of the device obtaining the image data, for example, light sources in conjunction with the optics of a camera, can be reasonably described by using these surfaces. For example, if the light source consists of a ring of individual light emitting diode (LED) bulbs, the intensity variability across the image could be described by a simple polynomial equation of order 2 when the bulbs are relatively new. This equation can be used to flatten the image (to make the light intensity relatively equal over the image). However, it can be assumed that the light source is not a perfect circle and is not perfectly symmetrical. In addition, as the output of the LED bulbs is attenuated by age, surface scratches or dirt, or other factors, the non-uniformity of the surface increases. The increased non-uniformity requires higher orders polynomial surfaces for surface equalization. Although menu 210 shows up to six orders, higher orders can be added to the present invention.

There are additional kind of surfaces such as trigonometric (uses sines and cosines), Fourier surfaces (a kind of trigonometric surface) and others that use different wave-forms (i.e. non-polynomial equations). One advantage of the use of polynomial surfaces, as described above, is the rapid speed with which a solution can be obtained. In addition, it is relatively straightforward for the user to learn which surface (order) provides the most favorable results by a relatively simple trial and error process. In contrast, for the other surface types noted above, a user needs additional statistics and/or knowledge to decide the 'optimal' surface to use.

Figure 4:
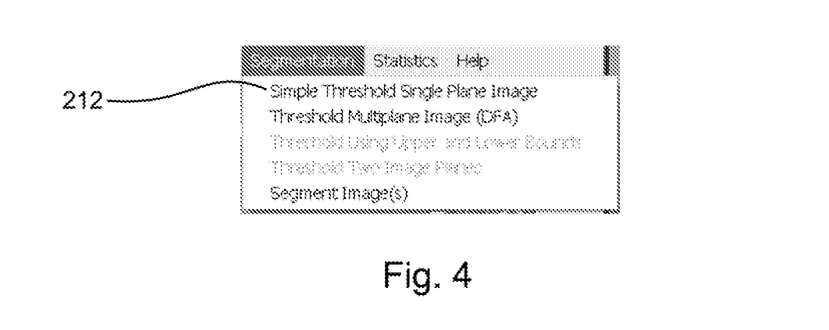
Figure 5:
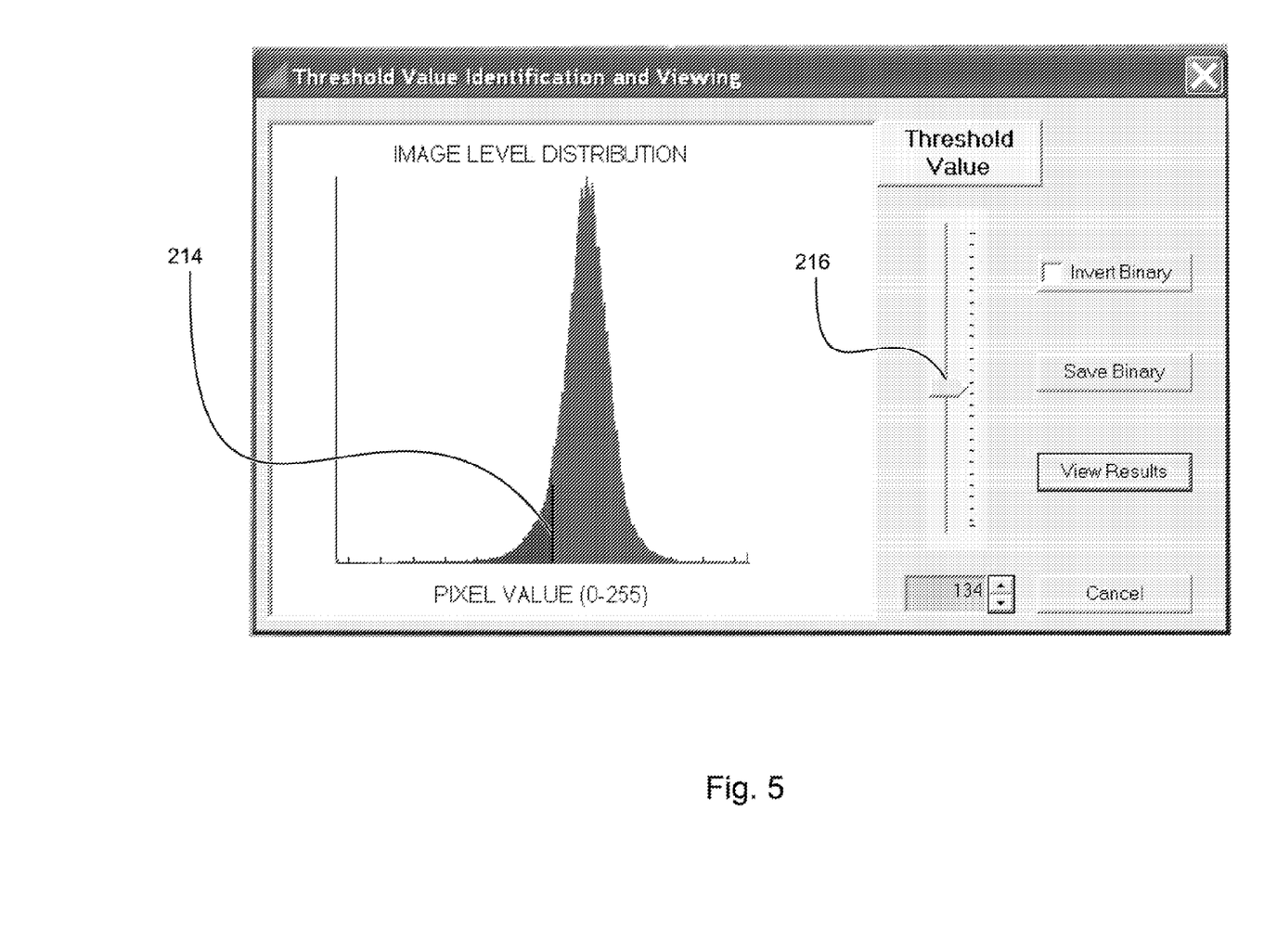

To generate FIG. 5, the end user selected "Segmentation" from toolbar 202 and "Simple Threshold Single Plane Image" from menu 212, in FIG. 4. FIG. 5 shows pixels for binary image 124 divided into two segments bounded by threshold 214. That is, the image is created by straight forward thresholding. Pixels in the binary image are scaled in terms of image level representation. Slide 216 can be used to select the threshold value. If a new threshold value is selected, a different division of the pixels into two segments is shown. For example, the threshold could be moved to the right in FIG. 5 to balance, or equalize, the two segments.

The binary imaging process is extremely useful in evaluating an image or image data with respect to two distinct and mutually exclusive features. For example, holes and grains in a material, such as sandstone. For the purposes of identifying a hole or a grain, it is not particularly useful to quantify or keep track of variation within the categories of hole or grain. That is, sub-classes of grains or holes are not useful. What is needed is a "black and white" sorting on either side of a threshold, that is, every pixel is part of one or the other category. Either a pixel has the characteristic defined for a hole (one side of the threshold) or the characteristics defined for a grain (the other side of the threshold). For example, a color or light intensity level could be used as the threshold. For example, grains are typically "lighter" than holes. Thus, a binary image provides a clear and unambiguous representation of two categories, for example, a hole and a grain.

Figure 6:
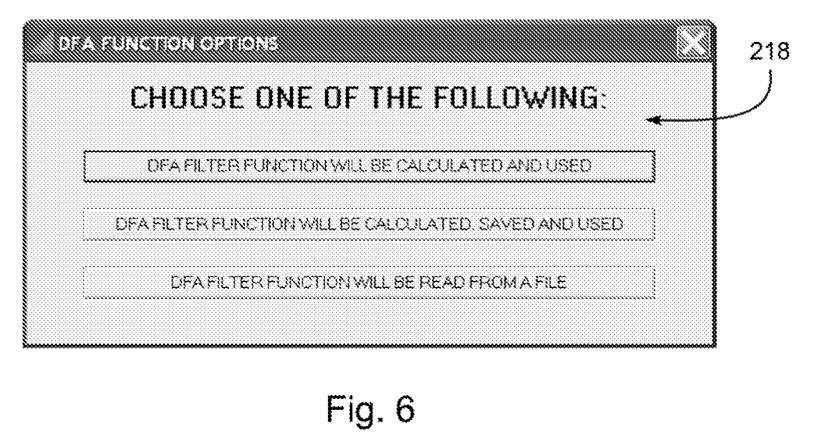

To generate FIG. 6, the end user has selected "Threshold Multiplane Image (DFA)" from options 218. Options 218 offer a variety of options for the user regarding DFA. A DFA function can be calculated, then used or saved, or a DFA function can be selected from storage for use. In an example embodiment, the DFA function operates on the original (unfiltered) image data. In an example embodiment, the DFA function operates on filtered image data, for example, filtered as described above.

Figure 7:
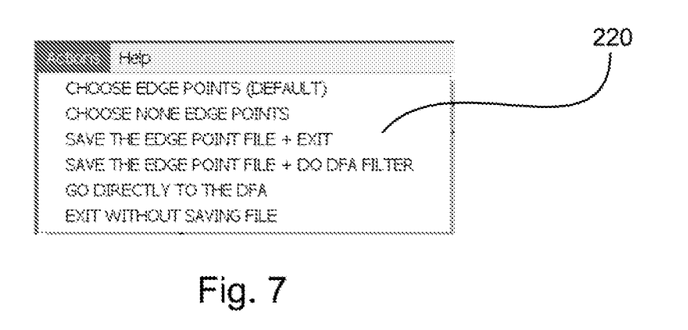
Figure 8:
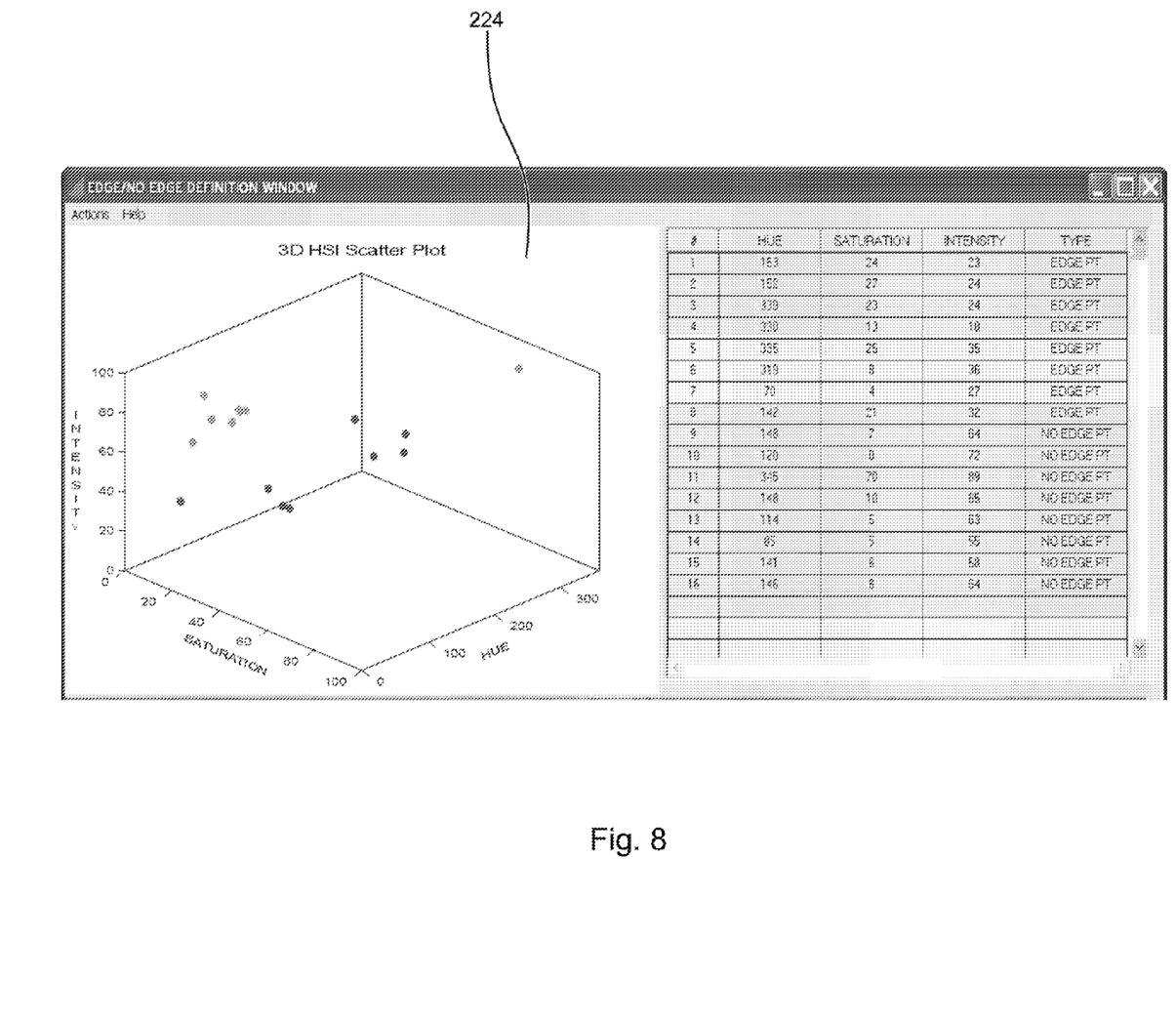

To generate FIG. 8, the end user selected the default option from menu 220 in FIG. 7. The user can then select edge points using the display in field 224. For example, the user can select pixels that represent the average range of the edges. When the user is done, the user then can select things (pixels) that are not edge points, for example, capturing the range of non-edge points like holes, other grains. In an example embodiment, the user can switch between choosing edge and non-edge points just by clicking on a button.

Figure 9:
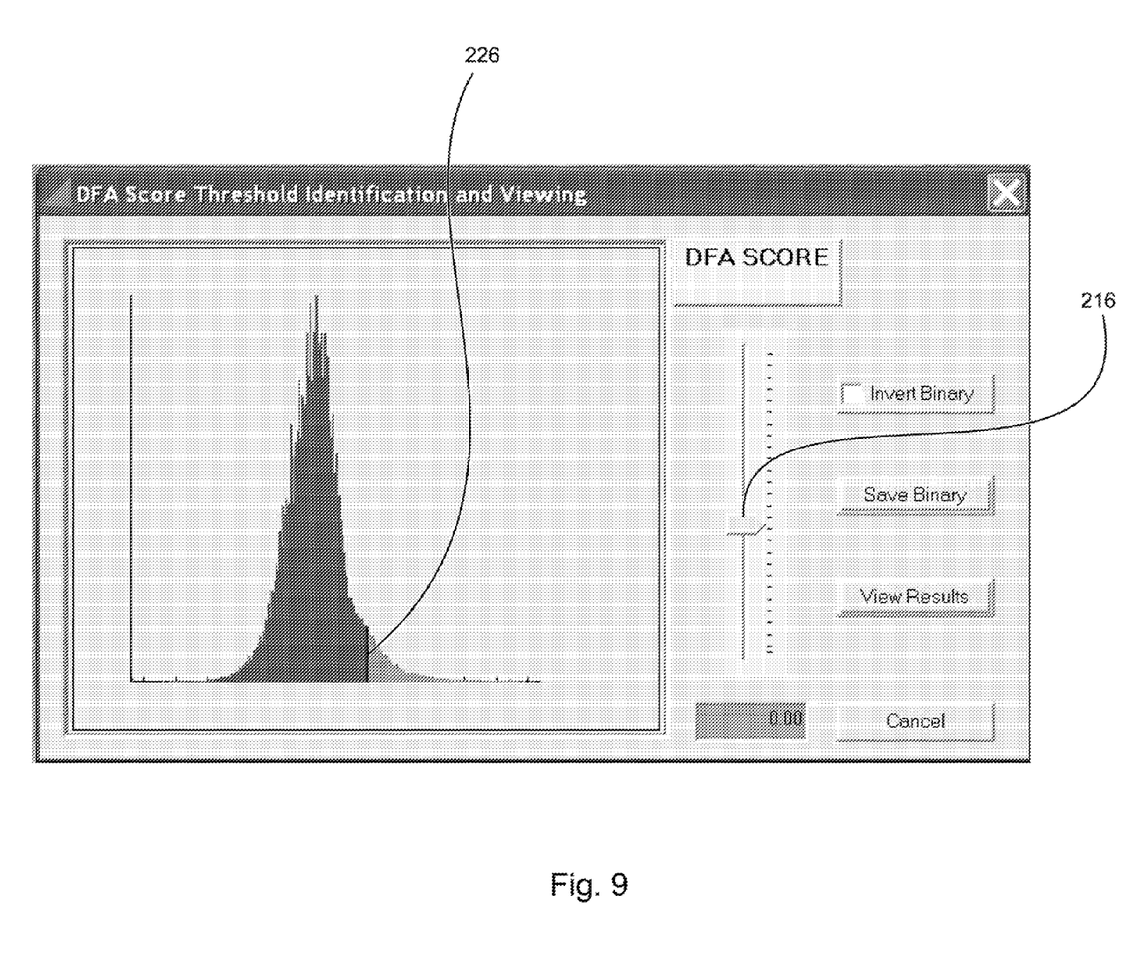

To generate FIG. 9, the end user clicks on the TEST button after a sufficient number of edge and non-edge pixels are identified. FIG. 9 shows pixels for binary image 124 generated by DFA, with pixels divided into two segments bounded by threshold 226. Pixels in the binary image are scaled by respective DFA scores. The binary image represents a composite of the independent information contained in all the data, for example, all three statistically independent color component planes, as opposed to the simple thresholding of a single, potentially non-unique image color plane. Again, slide 216 can be used to adjust the threshold. Automatic segmentation using the binary image of FIG. 5 or the binary image of FIG. 9 is implemented by identifying the edge points by values of the discriminant score less than the threshold. In an example embodiment, the system starts with a threshold of 0 and the discriminant score can range from positive infinity to negative infinity. The processor sets the respective pixels to "on" (set equal to one) for a negative value discriminant score, while setting the remaining points to "off" (setting equal to zero) for a negative discriminant score. In an example embodiment, if the processor identified the edge points as non-edge points and vice-versa, a simple click on a button is all it takes to invert the image (set 1 to 0 and 0 to 1). In an example embodiment, the system accepts input 110 and automatically performs filtering and DFA operations to generate a binary image.

Thus, the sequence of FIGS. 5-9 enables straight forward thresholding, the use of discriminant function and statistics, and multi-plane filtering for creation of a binary image. As well, the binary image is automatically segmented for the generation of parameter 128 or statistic 130.

To generate parameter 128 or statistic 130, the user selects "Statistic" from toolbar 202. In an example embodiment, the system automatically calculates some or all of parameters 128 and statistics 130, for example, from list 152. In an example embodiment, the end user can select options or operations associated with calculating some or all of parameters 128 and statistics 130, for example, as shown in FIG. 11 below.

Figure 10:
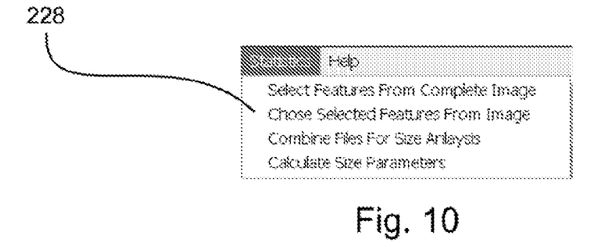
Figure 11:
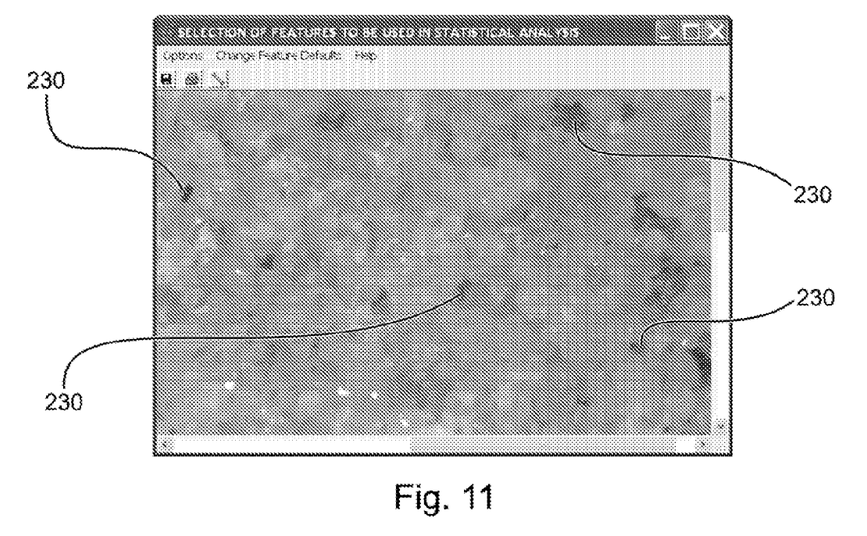

To generate FIG. 11, the end user selected "Select Features From Completed Image" from options 228 in FIG. 10. FIG. 11 is a pictorial representation of surface 118. The end user is able to click on and select features for the parameter/statistical analysis. For example, in FIG. 12, the end user has selected holes 230. The user also can select the minimum number of edge points (in a screen not shown). Thus, the end user can select features for analysis in both the automatic process and in the process using end user input. Multiple files can be combined for analysis. In an example embodiment, straight forward geology-based standard statistical analysis is performed. Plots and graphics of the various parameters and statistics also can be generated.

Figure 12:
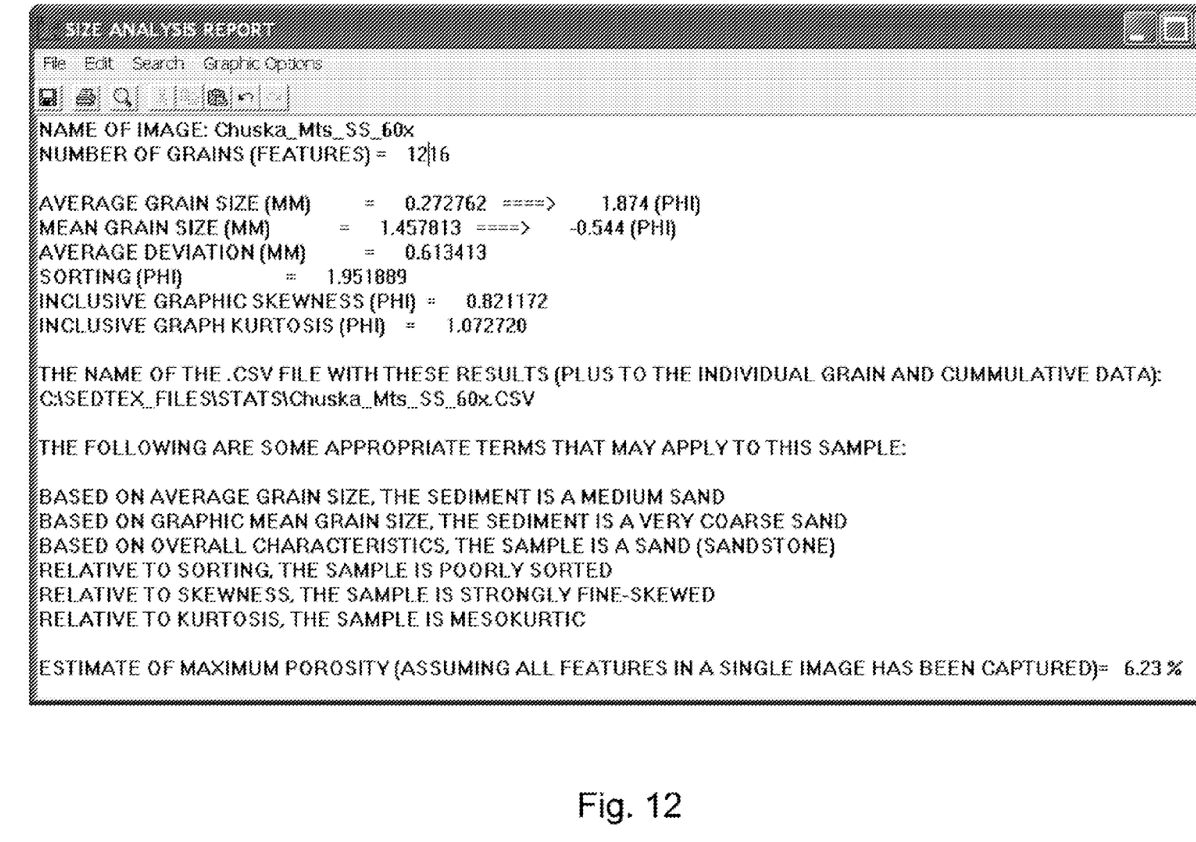

FIG. 12 shows a report with geology-based parameters 128 and statistics 130.

Figure 13:
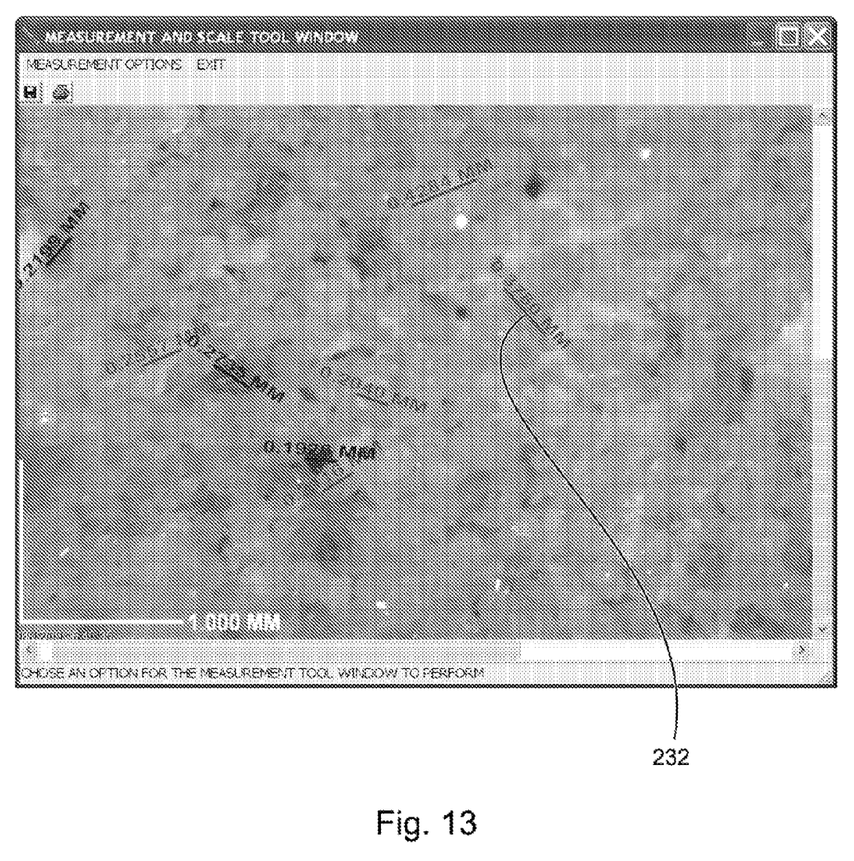

FIG. 13 shows an optional measuring tool. A user can select two points in the image displayed in the figure and system 100 calculates and displays the distance between the two points.

Advantageously, system 100 non-destructively obtains image data from a sample, for example, from material 118. Thus, the sampled material remains intact providing a record or documentation, or enabling further testing or sampling operations on the material. As an example, core samples can be kept intact after system 100 obtains image data, providing invaluable data regarding strata and other aspects of a bore hole.

System 100 can be used in geological applications, for example, to analyze surface rock or core samples to determine useful characteristics, features, parameters, or statistics relevant to oil or gas exploration. Computer 102 is portable and able to be carried and used by one person in field conditions, for example, in surveys of surface rock or on-site analysis of core samples. Thus, system 100 enables important analysis and determinations to be made in the field, saving time and reducing costs, for example, by eliminating the need to procure samples in the field, carry the samples out of the field, transport the samples to a laboratory, and wait to receive laboratory results.

According to aspects illustrated herein, there is provided a method for determining a characteristic of a material, including: accepting as input to a specially programmed portable computer, and using a processor for the specially programmed portable computer, image data, for a surface of a material, wherein the image data is accepted from a device including a light source and a magnifying element and wherein the image data includes a plurality of pixels; creating, using the processor, a binary image from the image data such that each pixel in the plurality of pixels has one of two possible values; segmenting, using the processor, the binary image such that an object occupying an area of the surface is located in the binary image and boundaries surrounding the object are located in the binary image; and generating, using the processor and the segmented binary image: one or more parameters regarding features of the material selected from the group consisting of size, shape, packing, orientation in space, and porosity; or at least one statistical parameter regarding at least one feature in the image data.

In an example embodiment, the at least one feature includes a hole in the material or a grain in the material. In an example embodiment, the method creates, using the processor, color image planes from the image data, the color image planes selected from the group consisting of hue, saturation, and intensity planes, and an RGB color model. In an example embodiment, the method includes creating, using the processor, a composite image. In an example embodiment, the method includes performing regional image equalization, using the processor, on polynomial surfaces of the composite image. In an example embodiment, the polynomial surfaces are due to non-uniform distribution of light on the surface of the material.

In an example embodiment, the method includes filtering, using the processor, all or part of the composite image to generate a first filtered image, wherein a filter is selected from the group consisting of an image equalization filter, a noise reduction filter, an enhancement filter, a regional filter, a variance filter, a process filter, and erosion or dilation operations on the image; or performing, using the processor, fast Fourier filtering of the composite image to generate a second filtered image. In an example embodiment, creating the binary image includes using the first or second filtered image.

In an example embodiment, creating the binary image includes performing, using the processor, discriminant function analysis (DFA) on the image data by: defining a mathematical function with a dependent variable and at least one independent variable; and predicting, for each pixel in the plurality of pixels, the dependent variable as related to said each pixel by the at least one independent variable. In an example embodiment, performing DFA includes: selecting, using the processor, first and second features from the features for the material; generating, using the processor, a linear equation that separates first pixels from the plurality of pixels associated with the first feature from second pixels from the plurality of pixels associated with the second feature; assigning, using the processor and the linear equation, a respective discriminant score for said each pixel; and assigning, using the processor, said each pixel to one of a first or second discriminant category related to the first or second feature, respectively, according to the respective discriminant score and a first discriminant threshold, with a first value, defining a first boundary between the first and second discriminant categories.

In an example embodiment, the method includes accepting, using the processor, an input regarding a second value for the discriminant threshold; and re-assigning, using the processor, said each pixel to one of a first or second discriminant category related to the first or second feature, respectively, according to the respective discriminant score and a second discriminant threshold, with a second value, defining a second boundary between the first and second discriminant categories.

According to aspects illustrated herein, there is provided a method for determining a parameter of a material, including: accepting as input to a specially programmed portable computer, and using a processor for the specially programmed portable computer, image data, for a material, from a device including a light source and a magnifying element, wherein the image data includes a plurality of pixels; creating, using the processor, a binary image from the image data such that each pixel in the plurality of pixels has one of two possible values; decomposing, using the processor, the binary image such that the plurality of pixels are grouped according to a plurality of features in the material; and generating, using the processor and the decomposed binary image: one or more parameters regarding features of the material selected from the group consisting of size, shape, packing, orientation in space, and porosity; or statistical parameters regarding features of the material.

It should be understood that a present invention device is not limited to the configuration shown in the figures. For example, different numbers and configurations of components can be used to obtain the claimed invention.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A computer based method for determining a characteristic of a material, comprising:
    accepting as input to a specially programmed portable computer, and using a processor for the specially programmed portable computer, image data, for a surface of a material, wherein the image data is accepted from a device including a light source and a magnifying element and wherein the image data includes a plurality of pixels;
    creating, using the processor, a binary image from the image data such that each pixel in the plurality of pixels has one of two possible values;
    segmenting, using the processor, the binary image such that an object occupying an area of the surface is located in the binary image and boundaries surrounding the object are located in the binary image; and,
    generating, using the processor and the segmented binary image:
        one or more parameters regarding features of the material selected from the group consisting of size, shape, packing, orientation in space, and porosity; or,
        at least one statistical parameter regarding at least one feature in the image data, wherein:
    creating the binary image includes performing, using the processor, discriminant function analysis (DFA) on the image data by:
        defining a mathematical function with a dependent variable and at least one independent variable; and,
        predicting, for each pixel in the plurality of pixels, the dependent variable as related to said each pixel by the at least one independent variable and,
    performing DFA includes:
        selecting, using the processor, first and second features from the features for the material;
        generating, using the processor, a linear equation that separates first pixels from the plurality of pixels associated with the first feature from second pixels from the plurality of pixels associated with the second feature;
        assigning, using the processor and the linear equation, a respective discriminant score for said each pixel; and,
        assigning, using the processor, said each pixel to one of a first or second discriminant category related to the first or second feature, respectively, according to the respective discriminant score and a first discriminant threshold, with a first value, defining a first boundary between the first and second discriminant categories.

2. The method of claim 1 wherein the at least one feature includes a hole in the material or a grain in the material.

3. The method of claim 1, further comprising creating, using the processor, color image planes from the image data, the color image planes selected from the group consisting of hue, saturation, and intensity planes, and an RGB color model.

4. The method of claim 1, further comprising creating, using the processor, a composite image.

5. The method of claim 4, further comprising performing regional image equalization, using the processor, on polynomial surfaces of the composite image.

6. The method of claim 5, wherein the polynomial surfaces are due to non-uniform distribution of light on the surface of the material.

7. The method of claim 4, further comprising:
    filtering, using the processor, all or part of the composite image to generate a first filtered image, wherein a filter is selected from the group consisting of an image equalization filter, a noise reduction filter, an enhancement filter, a regional filter, a variance filter, a process filter, and erosion or dilation operations on the image; or,
    performing, using the processor, fast Fourier filtering of the composite image to generate a second filtered image.

8. The method of claim 7, wherein creating the binary image includes using the first or second filtered image.

9. The method of claim 1, further comprising:
    accepting, using the processor, an input regarding a second value for the discriminant threshold; and,
    re-assigning, using the processor, said each pixel to one of a first or second discriminant category related to the first or second feature, respectively, according to the respective discriminant score and a second discriminant threshold, with a second value, defining a second boundary between the first and second discriminant categories.

10. A computer based system for determining a characteristic of a material, comprising:
a processor in a specially programmed portable computer for:
  accepting as input from a device including a light source and a magnifying element, image data for a surface of a material, wherein the image data includes a plurality of pixels;
  creating a binary image from the image data such that each pixel in the plurality of pixels has one of two possible values;
  segmenting the binary image such that an object occupying an area of the surface is located in the binary image and boundaries surrounding the object are located in the binary image; and,
  generating, using the segmented binary image:
    one or more parameters regarding features of the material selected from the group consisting of size, shape, packing, orientation in space, and porosity; or,
    at least one statistical parameter regarding at least one feature in the image data;
a memory unit for the specially programmed computer for storing at least one of the binary image, the segmented binary image, the one or more parameters, or the at least one statistical parameter, wherein:
the processor is for creating the binary image by performing discriminant function analysis (DFA) on the image data by:
  defining a mathematical function with a dependent variable and at least one independent variable; and,
  predicting, for each pixel in the plurality of pixels, the dependent variable as related to said each pixel by the at least one independent variable;
performing DFA using the processor includes:
  selecting first and second features from the features for the material;
  generating a linear equation that separates first pixels from the plurality of pixels associated with the first feature from second pixels from the plurality of pixels associated with the second feature;
  assigning, using the linear equation, a respective discriminant score for said each pixel; and,
  assigning said each pixel to one of a first or second discriminant category related to the first or second feature, respectively, according to the respective discriminant score and a first discriminant threshold, with a first value, defining a first boundary between the first and second discriminant categories.

11. The system of claim 10 wherein the at least one feature includes a hole in the material or a grain in the material.

12. The system of claim 10, wherein the processor is for creating color image planes from the image data, the color image planes selected from the group consisting of hue, saturation, and intensity planes, and an RGB color model.

13. The system of claim 10, wherein the processor is for creating a composite image.

14. The system of claim 13, wherein the processor is for performing regional image equalization on polynomial surfaces of the composite image.

15. The system of claim 13, wherein the processor is for:
  filtering all or part of the composite image to generate a first filtered image, wherein a filter is selected from the group consisting of an image equalization filter, a noise reduction filter, an enhancement filter, a regional filter, a variance filter, a process filter, and erosion or dilation operations on the image; or,
  performing fast Fourier filtering of the composite image to generate a second filtered image.

16. The system of claim 15, wherein the processor is for creating the binary image using the first or second filtered image.

17. The system of claim 10, wherein the processor is for:
  accepting an input regarding a second value for the discriminant threshold; and,
  re-assigning said each pixel to one of a first or second discriminant category related to the first or second feature, respectively, according to the respective discriminant score and a second discriminant threshold, with a second value, defining a second boundary between the first and second discriminant categories.

* * * * *